United States Patent [19]

Karim

[11] Patent Number: 4,943,461

[45] Date of Patent: Jul. 24, 1990

[54] RADIATION-CURABLE PRESSURE-SENSITIVE ADHESIVE HAVING IMPROVED ADHESION TO PLASTICIZED VINYL SUBSTRATES

[75] Inventor: Naimul Karim, Dormagen, Fed. Rep. of Germany

[73] Assignee: Minnesota Mining and Manufacturing Company, St. Paul, Minn.

[21] Appl. No.: 305,202

[22] Filed: Feb. 1, 1989

[51] Int. Cl.$^5$ .................... C09J 109/02; C09J 133/08
[52] U.S. Cl. ...................................... 428/40; 428/345; 428/352; 428/354; 428/355; 525/205; 525/218
[58] Field of Search ............... 428/345, 353, 354, 355, 428/352, 325, 40; 525/205, 218

[56] References Cited

U.S. PATENT DOCUMENTS

| | | | |
|---|---|---|---|
| 2,601,016 | 6/1952 | Hendricks | 428/355 |
| 3,092,250 | 6/1963 | Knutson | 428/353 |
| 3,406,039 | 10/1968 | Paufler | 428/353 |
| 3,833,689 | 9/1974 | Usamoto | 525/218 |
| 3,922,421 | 11/1975 | Frank | 428/355 |
| 3,956,218 | 5/1976 | Keppler | 525/205 |
| 3,971,865 | 7/1976 | Murakami | 428/355 |
| 4,045,600 | 8/1977 | Williams | 427/379 |
| 4,212,912 | 7/1980 | Wartusch et al. | 428/209 |
| 4,272,573 | 6/1981 | Ewald et al. | 428/40 |
| 4,284,681 | 8/1981 | Tidmarsh et al. | 428/246 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,605,592 | 8/1986 | Paquette et al. | 428/334 |
| 4,710,536 | 12/1987 | Klingen et al. | 524/493 |
| 4,749,590 | 6/1988 | Klingen et al. | 427/54.1 |
| 4,753,846 | 6/1988 | Mudge | 428/343 |

FOREIGN PATENT DOCUMENTS

| | | |
|---|---|---|
| 150978 | 7/1985 | European Pat. Off. . |
| 2162191A | 12/1966 | United Kingdom . |
| 1051125 | 1/1986 | United Kingdom . |

OTHER PUBLICATIONS

*Journal of Plastic Film and Sheeting,* vol. 2, Apr., 1986, pp. 95–110.
"Materials for Adhesives", B. F. Goodrich, Mar. 1981.
U.S. Ser. No. 07/084,781 filed Aug. 17, 1987, (Zimmerman et al.), (U.S. Pat. No. 4,818,610), issued Apr. 4, 1989 for Unified Pressure Sensitive Adhesive Tape.

*Primary Examiner*—George F. Lesmes
*Assistant Examiner*—J. Davis
*Attorney, Agent, or Firm*—Donald M. Sell; Walter N. Kirn; Darla P. Neaveill

[57] ABSTRACT

The current invention provides a photopolymerized pressure-sensitive adhesive which adheres well to all common surfaces and has an outstanding ability to bond to plasticized vinyl substrates and to remain firmly bonded thereto even after remaining in contact therewith for extended periods of time comprising an acrylic copolymer and a nitrile butadiene rubber or mixture of rubbers. Preferred pressure-sensitive adhesives of the invention comprise from about 1 to about 10 parts of the nitrile rubber or a mixture thereof.

14 Claims, No Drawings

RADIATION-CURABLE PRESSURE-SENSITIVE ADHESIVE HAVING IMPROVED ADHESION TO PLASTICIZED VINYL SUBSTRATES

BACKGROUND OF THE INVENTION

This invention relates to normally tacky and pressure-sensitive adhesive compositions and to pressure-sensitive adhesive tapes made therewith. The invention is particularly concerned with pressure-sensitive adhesive products capable of adhering firmly to plasticized vinyl substrates, both initially and after contact over an extended period of time.

Polyvinyl chloride (or, as it is more commonly referred to, "vinyl") is one of the most versatile and widely used synthetic polymers available today. In its unmodified form, it is rigid and capable of being fabricated into containers, structural components, tubing, etc. When compounded with a plasticizer, it can be calendered into flexible sheet material that can be used as upholstery fabric, floor covering, pressure-sensitive adhesive tape backing, rainwear, etc., or extruded as electrical insulation, auto body side moulding, etc. Plasticized vinyls typically contain 15-50% by weight of either a mononeric or a polymeric plasticizer; because the monomeric plasticizers are less expensive, they are more commonly employed. Unfortunately, however, the monomeric plasticizers are of relatively low molecular weight, tending not only to migrate to the surface of the plasticized vinyls but also to volatilize therefrom, gradually embrittling the originally flexible product.

The tendency of a plasticizer to migrate into materials with which it comes in contact is also well known; see, e.g., U.S. Pat. No. 4,284,681. Thus, when a pressure-sensitive adhesive is applied to a plasticized vinyl substrate and allowed to remain in contact with it for an extended period of time, plasticizer from the vinyl tends to migrate into the pressure-sensitive adhesive, softening it and causing a decrease in adhesion; see, e.g., U.K. Pat. No. 1,051,125. Attempts have been made to solve the plasticizer migration problem by interposing an impenetrable barrier between the vinyl and the pressure-sensitive adhesive; see, e.g., U.S. Pat. Nos. 4,045,600 and 4,605,592. Others have developed pressure-sensitive adhesives that are said to be less susceptible to weakening by plasticizer; see, e.g., Graziano et al, Development of Acrylic Latex Pressure Sensitive Adhesive for Plasticized PVC films, *Journal of Plastic Film & Sheeting*, Vol. 2, April 1986, pp. 95-110. A commercially available tape that is widely used for adhering to plasticized vinyl utilizes a pressure-sensitive adhesive that is a terpolymer of 2-ethyl hexyl acrylate, vinyl acetate, and ethyl acrylate.

Another attempt to prevent migration of plasticizer from a plasticized vinyl substrate into a confronting pressure-sensitive adhesive has been to incorporate plasticizer into the pressure-sensitive adhesive, thereby minimizing the plasticizer gradient between the contacting layers; see, e.g., U.S. Pat. No. 4,272,573, U.K. Patent Application No. 2,162,191-A, and European Patent Application No. 150,978.

U.S. Pat. No. 4,753,846, issued June 28, 1988, discloses adhesive compositions suitable for application to plasticized vinyl comprising 30-70% of a vinyl ester or an alkenoic acid, 10-30% by weight ethylene, 20-40% by weight of a di-2-ethylhexyl maleate or di-n-octyl maleate or fumarate, and 1-10% of a mono-carboxylic acid.

Copolymers of acrylonitrile and butadiene are described in a B. F. Goodrich booklet entitled "Materials for Adhesives" dated March 1981, which states that when nitrile rubber is used in an adhesive, it should be combined with tackifiers, softeners, resins or other rubbers (pages 5, 8, 9 and 47) and often is combined with curing agents such as an isocyanate prepolymer (page 11).

In U.S. Pat. No. 4,212,912, an adhesive layer comprising an acrylonitrile/butadiene copolymer employs an organic peroxide to crosslink the polymer.

Despite the limited success achieved by products of the type discussed in preceding paragraphs, there has remained a strong commercial desire for a pressure-sensitive adhesive that was more effective, particularly one that not only initially adhered strongly to plasticized vinyl but which also retained a high degree of adhesion after remaining in contact with it for extended periods of time. In particular, none of the prior art products have been able to provide excellent resistance to shear after prolonged contact with plasticized vinyl.

Applicant has now discovered that certain acrylic copolymers comprising an alkyl acrylate monomer and a polar nitrogen-containing vinyl monomer photopolymerized in mixture with a nitrile butadiene rubber has surprising resistance to shear on plasticized substrates, including plasticized vinyl.

SUMMARY OF THE INVENTION

The current invention provides a photopolymerized pressure-sensitive adhesive which adheres well to all common surfaces and has an outstanding ability to bond to plasticized vinyl substrates and to remain firmly bonded thereto even after remaining in contact therewith for extended periods of time, comprising an acrylic copolymer and a nitrile butadiene rubber or mixture of rubbers.

The invention comprises a polymer of monomers comprising from about 60 to about 85 parts by weight of acrylic acid ester of nontertiary alkyl alcohol containing 4-14 carbon atoms, such as butyl acrylate, or especially isooctyl acrylate or isononyl acrylate, and from about 15 to about 40 parts by weight of a polar nitrogen-containing vinyl monomer, such as N-vinyl pyrrolidone, N-vinyl caprolactone, and the like. Photopolymerized in admixture with the vinyl monomer, in an amount suitable to achieve the desired degree of pressure-sensitive adhesion, is an acrylonitrile butadiene rubber or mixture thereof. Pressure-sensitive adhesives of the invention comprises from about 1 to about 10 parts by weight of the nitrile rubber or a mixture thereof per 100 parts of the acrylic copolymer.

In most cases, the pressure-sensitive adhesive will be in the form of a thin layer carried by a backing to which it may be either permanently or temporarily adhered. Where the pressure-sensitive adhesive is permanently adhered, the resultant product is a normally tacky pressure-sensitive adhesive tape. Where the backing is provided with a release coating, the pressure-sensitive adhesive is in the form of a so-called transfer tape.

As used herein, the terms "acrylonitrile butadiene rubber" and "nitrile rubber" are interchangeable, and refer to copolymers having both varied amounts of bound acrylonitrile and varying levels of hydrogenation.

DETAILED DESCRIPTION

The acrylic copolymers contain at least one alkyl acrylate monomer, preferably a monofunctional unsaturated acrylate ester of non-tertiary alkyl alcohol, the molecules of which have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The acrylic copolymers preferably contain from about 60 to about 85 parts of the alkyl acrylate monomer, more preferably from about 60 to about 75 parts. Most preferably, the alkyl acrylate monomers are polymerized with at least one polar nitrogen-containing vinyl monomer.

Polar nitrogen-containing vinyl monomers useful in pressure-sensitive adhesives of the invention include N-vinyl pyrrolidone, N-vinyl caprolactone, N,N-pentamethylene acrylamide, or N,N-dimethyl acrylamide. N-vinyl pyrrolidone is preferred.

Acrylonitrile butadiene rubbers useful in compositions of the invention include solid and liquid rubbers, and both hydrogenated and nonhydrogenated rubbers having varying acrylonitrile content, e.g., from about 10% to about 45%. Commercially available rubbers include Therban TM 1707 (hydrogenated, 34% bound acrylonitrile) and Perbunan TM 3312NS (nonhydrogenated, 34% bound acrylonitrile), both available from Bayer Aktiengelleschaft, Nipol TM N-30L (non-hydrogenated, 30% bound acrylonitrile), and Zetpol TM 1020, 2010, and 2020 (partially hydrogenated, 45% bound acrylonitrile, 37% bound acrylonitrile, and 37% bound acrylonitrile, respectively) all available from Nippon Zeon and various rubbers from B. F. Goodrich, e.g., Hycar TM 1300×23 (terminal and pendant vinyl groups, 16% bound acrylonitrile). Hydrogenated acrylonitrile butadiene rubbers are preferred.

Preferred pressure-sensitive adhesives of the invention contain from about 5 to about 10 parts by weight of the nitrile rubber per 100 parts of acrylic copolymer (phr).

The mixture of the nitrile rubber and the polymerizable monomers also contains a photoinitiator to induce polymerization of the monomers. Photoinitiators which are useful include the benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenylacetophenone, substituted alpha-ketols such as 2-methyl-2-hydroxypropiophenone, aromatic sulfonyl chlorides such as 2-naphthalene sulfonyl chloride, and photoactive oximes such as 1-phenyl-1,1-propanedione-2-(0-ethoxycarbonyl)-oxime. The photoinitiator is present in an amount of about 0.01 to about 1 phr of the instant pressure-sensitive adhesive compositions.

The mixture of the nitrile rubber and the photopolymerizable monomers may also contain a crosslinking agent. Preferred crosslinking agents for an acrylic pressure-sensitive adhesive are multifunctional acrylates such as 1,6-hexanediol diacrylate as well as those disclosed in U.S. Pat. No. 4,379,201 (Heilmann et al.), incorporated herein by reference, such as trimethylolpropane triacrylate, pentaerythritol tetracrylate, 1,2-ethylene glycol diacrylate, and 1,2-dodecanediol diacrylate. Other useful crosslinking agents include the substituted triazines, such as those disclosed in U.S. Pat. Nos. 4,329,384 (Vesley et al.) and 4,330,590 (Vesley), both incorporated herein by reference, e.g., 2,4-bis(trichloromethyl)-6-p-methoxystyrene-5-triazine and the chromophore halomethyl-5-triazines. When used, the crosslinking agent is present in an amount of from about 0.01 to about 1 phr.

Tapes of the invention may also have a backing or core layer. The core layer may consist of such materials as acrylates, polyethylenes, polypropylenes, neoprenes, polyolefins, polyurethanes, silicones, etc.

In a preferred embodiment, the core layer consists of an ultraviolet-radiation polymerized acrylic copolymer which may incorporate similar or dissimilar acrylic monomers in like or unlike thicknesses, having similar or different additives from those acrylic copolymers contained in the adhesive layer. The core layers preferably comprise from about 60 to about 90 parts of an alkyl acrylate polymer, and correspondingly, up to about 10 parts, most preferably up to about 5 parts of a polar copolymerizable monomer selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers such as N-vinyl pyrrolidone, acrylonitrile, vinyl chloride or diallyl phthalate.

In tapes of the invention, either the pressure-sensitive adhesive layer or the core layer may be a foam-like layer, e.g., a monomer blend comprising microspheres may be used. The microspheres may be glass or polymeric. The microspheres should have an average diameter of 10 to 200 micrometers, and comprise from about 5 to about 65 volume percent of the core layer. The thickness of foam-like layers in preferred tapes of the invention range from 0.3 mm to about 4.0 mm in thickness.

Preferred glass microspheres have average diameters of about 80 micrometers. When glass microspheres are used, the polymeric matrix should be at least 3 times as thick as their diameter, preferably at least 7 times. The thickness of layers containing such glass microspheres should be at least six times, preferably at least twenty times that of each microsphere-free layer.

Other useful materials which can be blended into the pressure-sensitive adhesive layer or the core layer include, but are not limited to, fillers, pigments, fibers, woven and nonwoven fabrics, antioxidants, stabilizers, fire retardants, and viscosity adjusting agents.

An especially useful filler material is hydrophobic silica as disclosed in U.S. Pat. Nos. 4,710,536 and 4,749,590, (Klingen, et al.), both of which are incorporated herein by reference. In one preferred embodiment of the present invention, the pressure-sensitive adhesive layer further comprises from about 2 to about 15 phr of a hydrophobic silica having a surface area of at least 10 $m^2/g$.

The pressure-sensitive adhesive composition is preferably prepared by dissolving or dispersing the rubber into the polar nitrogen-containing vinyl monomer and then adding the alkyl acrylate monomer, and photoinitiator. Optional crosslinking agent or other additives may also be incorporated into the syrup.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air.

Where multilayer tape constructions are desirable, a preferred method of construction is multilayer coating, as described in U.S. Ser. No. 84,781, (Zimmerman et al.), now U.S. Pat. No. 4,818,610, incorporated herein by reference, wherein a plurality of copolymerizable coatable composition is prepared, each composition containing at least one photopolymerizable monomer, one of the coatable composition being the novel pressure-sensitive adhesives of the invention. The coatable compositions are coated to provide a plurality of superimposed layers with contiguous layers defining an interface therebetween, with the novel pressure-sensitive adhesive terpolymer of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

In the examples that will appear below, certain test procedures were used to evaluate the ability of a given pressure-sensitive adhesive to adhere to plasticized vinyl substrates.

90° Peel Adhesion. This test is conducted in accordance with a modified version of PSTC-14, a procedure specified in "Test Methods for Pressure-Sensitive Tapes," 8th edition, available from the Pressure-Sensitive Tape Council, 1800 Pickwick Ave., Glenview, IL 60025-1377, U.S.A. A strip of the tape to be tested, 2.54 cm wide × 30 cm. long, is adhered to a test panel, which in turn is mounted on a sled and clamped horizontally in the lower jaw of a tensile testing machine. One end of the tape is then stripped away and clamped in the upper jaw of the tensile tester. The jaws are then separated at approximately 30 cm/minute while measuring the force required to remove the tape at an angle of 90°. Results are measured in oz/inch of width and converted to N/dm.

180° Peel Adhesion. This test is conducted in accordance with PSTC-7, a procedure specified in the same publication referred to above. A strip of tape 12.7 mm wide and about 30 cm long is adhered to a panel about 5 cm × 12.5 cm. One end of the tape is then doubled back on itself to expose about 2.5 cm at the end of the panel. This exposed end is then clamped in the upper jaws of a tensile testing machine and the doubled-back free end of the tape clamped in the lower jaws. The jaws are then separated at about 30 cm/minute. The force required to strip the tape from the panel is measured in oz/½ inch and reported as N/dm.

T-Peel Adhesion. A foam tape or other double-coated tape sample is placed between two strips of 19 mm × 200 mm × 0.125 mm anodized aluminum, leaving an adhesive-free 25 mm tab at each end of each aluminum strip. The assembly is rolled down with a 6.8 kg roller, one pass in each direction, and the samples then conditioned for 1-2 hours at room temperature. The tabs are bent back at 90° in opposite directions and respectively clamped in the upper and lower jaws of a tensile testing machine, after which the jaws are separated at 30.5 cm/minute, noting the average force required to effect separation.

Plasticizer Resistance. For this test, a T-Peel adhesion sample is set up as described in the above paragraph, using a plasticized substrate, either plasticized vinyl or a plasticized canvas containing about 60% low molecular weight plasticizers. The samples are then aged on the plasticized substrate for two weeks at 70° C. The sample is then clamped into a tensile tester, and the T-Peel measured as described above.

Shear Adhesion. This test is conducted in accordance with PSTC-7, a procedure specified in the same publication referred to above. A 12.7-mm × 10-cm strip of the tape to be tested is applied to a stainless steel vertical test panel so that a terminal 2.54-mm × 12.7-mm area is in contact. A weight of either 500 or 1000 grams is then applied to the free end of the tape and the time to failure noted. If no failure has occurred in 10,000 minutes, the test is discontinued.

Understanding of the invention will be enhanced by referring to the following examples, in which all parts and percentages are by weight unless otherwise noted.

EXAMPLE 1

A pressure-sensitive adhesive tape was made by polymerizing a mixture of 67 parts by weight isooctyl acrylate (IOA), 33 parts by weight N-vinyl pyrrolidone (NVP), 6.3 parts by weight of a hydrogenated liquid acrylonitrile-butadiene (available as Therban TM 1707 from Bayer, Leverkusen, Germany), 0.19 parts by weight of 2,2-dimethoxy-2-phenylacetophenone (Irgacure TM 651 available from Ciba Geigy) as a photocatalyst. The mixture was knife coated onto a 0.1 mm biaxially oriented polyethylene terephthalate (PET) film, and covered by a silicone-coated, 0.1 mm PET film, at a knife setting which was adjusted to squeeze the syrup to provide a uniform coating about 0.20 mm thick. The composite was exposed to a bank of Sylvania 40-watt ultraviolet lamps which provide ultraviolet radiation at a rate of 1 mw/sec/cm$^2$, and received a total energy of 400 mj/cm$^2$. T-Peel, 90° peel and static shear were measured on this sample and the test results are listed in Table I.

COMPARATIVE EXAMPLE 1-C

This was made similar to Example 1 except that the IOA and NVP was partially polymerized using UV light and 0.04 pph Irgacure 651. The partial polymerization was accomplished in an inert (nitrogen) atmosphere to provide a coatable syrup having a viscosity of about 500-50,000 CPS. To this syrup was added 0.1 parts by weight of a multiacrylate crosslinker, e.g., 1,6-hexanediol diacrylate (HDDA), and 0.3 parts by weight of Irgacure 651 was used instead of 0.19 parts by weight. No acrylonitrile-butadiene was added. This was also tested similar to Example 1 and the test results are shown in Table I.

TABLE I

| EXAMPLE | 1 | 1-C |
|---|---|---|
| T-Peel (N/dm) | | |
| (a) UPVC* | | |
| 20 min. dwell, room temp. | 106 (AT)** | 25 |
| 1 day dwell, 70° C. | 132 (AT)** | 134 (AT)** |

TABLE I-continued

| EXAMPLE | 1 | 1-C |
|---|---|---|
| (b) Canvas*** | | |
| 20 min. dwell, room temp. | 80 | 102 |
| 1 day dwell, 70° C. | 116 | 126 (partial AT)** |
| 14 days dwell, 70° C. | 94 | 34 |
| 90° Peel (N/dm) | | |
| (a) Glass | | |
| 20 min. dwell, room temp. | 100 | 35 |
| 3 days dwell, room temp. | 100 | 106 |
| (b) Stainless Steel | | |
| 20 min. dwell, room temp. | 80 | 22 |
| 3 days dwell, room temp. | 107 | 114 |
| (c) Polypropylene | | |
| 20 min. dwell, room temp. | 18 | 8 |
| 3 days dwell, room temp. | 18 | 10 |
| Static Shear (min) | | |
| (a) room temp., 1 Kg. wt | 10,000+ | 10,000+ |
| (b) 70° C., 500 g wt. | 10,000+ | 10,000+ |

*Unplasticized polyvinylchloride sheets
**Adhesive Transfer from backing to substrate
***Highly plasticized canvas film containing approximately 60% low molecular weight plasticizer (available as Duraskin B-129 334-048 from Verseidag)

EXAMPLES 2-4

These were made similar to Example 1 except with different Acrylonitrile-butadiene and different ratios of IOA:NVP. These differences are shown in Table II. Tests were also carried out similar to Example 1 and are shown in Table II.

TABLE II

| EXAMPLE | 2 | 3 | 4 |
|---|---|---|---|
| Rubber (parts by weight) | 6.3 Therban 1707 | 6.3 Perbunan | 6.3 Perbunan |
| Acrylic Monomer (IOA/NVP) (parts by weight) | 73:27 | 67:33 | 73:27 |
| T-Peel (N/dm) | | | |
| (a) UPVC* | | | |
| 20 min. dwell, room temp. | 108 | 110 | 98 |
| 1 day dwell, 70° C. | 138 | 235 | 130 |
| (b) Canvas*** | | | |
| 20 min. dwell, room temp. | 112 | 118 | 100 |
| 1 day dwell, 70° C. | 114 | 160 | 110 |
| 14 days dwell, 70° C. | 62 | 90 (AT)** | 73 |
| 90° Peel (N/dm) | | | |
| (a) Glass | | | |
| 20 min. dwell, room temp. | 90 | 88 | 86 |
| 3 days dwell, room temp. | 92 | 97 | 94 |
| (b) Stainless Steel | | | |
| 20 min. dwell, room temp. | 115 | 82 | 102 |
| 3 days dwell, room temp. | 131 | 95 | 111 |
| (c) Polypropylene | | | |
| 20 min. dwell, room temp. | 78 | 15 | 38 |
| 3 days dwell, room temp. | 61 | 58 | 46 |
| Static Shear (min) | | | |
| (a) room temp., 1 Kg. wt | 10,000+ | 10,000+ | 10,000+ |
| (b) 70° C. 500 g wt. | 10,000+ | 10,000+ | 10,000+ |

*Unplasticized polyvinylchloride sheets
**Adhesive Transfer from backing to substrate
***Highly plasticized canvas film containing approximately 60% low molecular weight plasticizer (available as Duraskin B-129 334-048 from Verseidag)

EXAMPLES 5 AND 6

These were made similar to Example 1 except with different amounts of Therban 1707 and 65:35 IOA/NVP ratio. Four parts of hydrophobic silica (Aerosil ™ R-972 from Degussa) was also used. These were coated on a silicon-coated PET to produce transfer tapes. These differences are shown in Table III along with the test results.

TABLE III

| EXAMPLE | 5 | 6 |
|---|---|---|
| Rubber (parts by weight) | 8 Therban 1707 | 10 Therban 1707 |
| Acrylic Monomer (IOA/NVP) (ratio) | 65:35 | 65:35 |
| T-Peel (N/dm) | | |
| (a) Canvas*** | | |
| 20 min. dwell room temp. | 119 | 112 |
| 14 days dwell, 70° C. | 105 | 96 |
| 90° Peel (N/dm) | | |
| (a) Stainless Steel | | |
| 20 min. dwell, Room temp. | 24 | 18 |
| 3 days dwell, room temp. | 65 | 69 |
| (b) Polypropylene | | |
| 20 min. dwell, room temp. | 6 | 6 |
| 3 days dwell, room temp. | 10 | 10 |
| Static Shear (min) | | |
| (a) Room Temp., 1 Kg. wt | 10,000+ | 10,000+ |
| (b) 70° C., 500 g wt. | 10,000+ | 10,000+ |

*Adhesive transfer from backing to substrate
**Cohesive failure of adhesive
***Highly plasticized canvas film containing approximately 60% low molecular weight plasticizer (available as Duraskin B-129 334-048 from Verseidag)

What is claimed is:

1. A photopolymerized pressure-sensitive adhesive having outstanding ability to bond to plasticized vinyl substrates and to remain firmly bonded thereto even after remaining in contact therewith for extended periods of time, comprising:
    (a) a copolymer of monomers consisting essentially of from about 60 to about 85 parts of acrylic acid ester of nontertiary alcohol, the alkyl groups of which contain from about 4-14 carbon atoms, and from about 15 to about 40 parts of a polar nitrogen-containing vinyl monomer, and
    (b) 1-10 parts of an acrylonitrile butadiene rubber, based on the weight of the copolymer.

2. The adhesive of claim 1 wherein the acrylonitrile butadiene rubber is at least partially hydrogenated.

3. The adhesive of claim 1 wherein the acrlyic acid ester is isooctyl acrylate.

4. The adhesive of claim 3 wherein the nitrogen-containing vinyl monomer is N-vinyl pyrrolidone.

5. The adhesive of claim 1 comprising from about 5 parts to about 10 parts of said acrylonitrile butadiene rubber.

6. The adhesive of claim 3 wherein the nitrogen-containing vinyl monomers is N,N-dimethyl-acrylamide.

7. The adhesive of claim 3 wherein the nitrogen-containing vinyl monomer is N,N-pentamethylene acrylamide.

8. The adhesive of claim 4 wherein the isooctyl acrylate comprises from about 60 to about 75 parts of the copolymer.

9. The adhesive of claim 1 further comprising a photoinitiator.

10. A pressure-sensitive adhesive tape comprising a layer of the adhesive of claim 1 carried by a sheet backing.

11. A pressure-sensitive adhesive tape comprising a layer of the adhesive of claim 3 carried by a sheet backing.

12. The tape of claim 10 wherein the surface of the backing adjacent the adhesive is provided with a release coating.

13. The tape of claim 10 wherein the adhesive contains glass microbubbles.

14. The tape of claim 10 wherein the adhesive further comprises a crosslinking agent to increase its shear adhesion.

* * * * *